United States Patent
Chen et al.

(10) Patent No.: US 10,833,587 B1
(45) Date of Patent: Nov. 10, 2020

(54) CONTROL CIRCUIT HAVING EXTENDED HOLD-UP TIME AND CONVERSION SYSTEM HAVING EXTENDED HOLD-UP TIME

(71) Applicant: P-DUKE TECHNOLOGY CO., LTD., Taichung (TW)

(72) Inventors: Lien-Hsing Chen, Taichung (TW); Chun-Ping Chang, Taichung (TW); Hao-Jen Wang, Taichung (TW); Yung-Chi Chang, Taichung (TW)

(73) Assignee: P-DUKE TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 16/675,293

(22) Filed: Nov. 6, 2019

(51) Int. Cl.
*H02M 3/158* (2006.01)
*H02J 9/06* (2006.01)

(52) U.S. Cl.
CPC ............. *H02M 3/158* (2013.01); *H02J 9/061* (2013.01)

(58) Field of Classification Search
None
See application file for complete search history.

(56) References Cited

U.S. PATENT DOCUMENTS

| | | | | |
|---|---|---|---|---|
| 7,408,795 B2 * | 8/2008 | Vinciarelli | ............ | H02M 3/157 323/265 |
| 7,729,143 B2 * | 6/2010 | Lin | ..................... | H02M 1/4208 363/65 |
| 9,024,609 B2 * | 5/2015 | Milavec | ..................... | H02J 1/10 323/224 |
| 9,627,958 B2 * | 4/2017 | Chun | .................. | H02M 1/4208 |
| 10,027,223 B1 | 7/2018 | Zhang et al. | | |
| 10,367,411 B2 * | 7/2019 | Martin | ....................... | G05F 1/70 |

FOREIGN PATENT DOCUMENTS

| TW | 201138280 A | 11/2011 |
|---|---|---|
| TW | 201739153 A | 11/2017 |
| TW | M552706 U | 12/2017 |
| TW | 201926878 A | 2/2020 |

OTHER PUBLICATIONS

Taiwanese Office Action in corresponding Taiwanese Application No. 108128229, dated Feb. 3, 2020.

* cited by examiner

*Primary Examiner* — Jeffery S Zweizig
(74) *Attorney, Agent, or Firm* — Bacon & Thomas, PLLC (57) ABSTRACT

A control circuit having extended hold-up time is coupled to a bus path of a conversion circuit. The control circuit includes a bypass circuit, an energy storage capacitor, and an auxiliary power circuit. The auxiliary power circuit supplies an energy storage voltage to the energy storage capacitor according to a working voltage provided by the conversion circuit. When a bus voltage of the bus path is less than or equal to the energy storage voltage, the energy storage voltage is supplied to the bus path through the bypass circuit so that the bus voltage is greater than or equal to a predetermined voltage within a hold-up time.

17 Claims, 7 Drawing Sheets

CONTROL CIRCUIT HAVING EXTENDED HOLD-UP TIME AND CONVERSION SYSTEM HAVING EXTENDED HOLD-UP TIME

BACKGROUND

Technical Field

The present disclosure relates to a control circuit having extended hold-up time, and more particularly to a control circuit having extended hold-up time that a bus voltage is greater than or equal to a predetermined voltage within a hold-up time.

Description of Related Art

The statements in this section merely provide background information related to the present disclosure and do not necessarily constitute prior art.

In recent years, as electronic products have become more and more popular, and in order to stably supply the power quality of electronic products, the power supply requirements for power supply apparatuses have gradually increased with the popularity of electronic products and their emphasis on power quality. The safety specification of the power supply apparatus stipulates that, in the process of supplying power to the electronic product by the power supply apparatus, if the power supply device is powered off, the power supply apparatus must still maintain the power supply apparatus for continuously outputting power for a short period of time.

In order to comply with the requirements of safety regulations, it is common practice to increase the capacity of the storage capacitor at the output of the power supply unit. When the capacity of the storage capacitor is larger, the longer the hold-up time can be maintained, the safety specification can be met. However, this practice causes the volume of the storage capacitor to become larger due to the larger capacity of the required storage capacitor. In addition, since the storage capacitor is directly coupled to the live wire end and the ground wire end at the output of the power supply apparatus, the withstand voltage of the storage capacitor must also be greater than the output voltage of the power supply apparatus (for example but not limited to, 400 volts), thereby avoiding damaging the storage capacitor due to insufficient withstand voltage. However, increasing the withstand voltage of the storage capacitor also means that the volume of the storage capacitor is also increased.

SUMMARY

In order to solve the above-mentioned problems, the present disclosure provides a control circuit having extended hold-up time. The control circuit includes a bypass circuit, an energy storage capacitor, and an auxiliary power circuit. The bypass circuit is coupled to a live wire end of the bus path. The energy storage capacitor has a first end and a second end, the first end is coupled to the bypass circuit and the second end is coupled to a ground wire end of the bus path. The auxiliary power circuit is coupled to the bypass circuit and the conversion circuit. The auxiliary power circuit provides an energy storage voltage to the energy storage capacitor according to a working voltage provided by the conversion circuit. When a bus voltage of the bus path is less than or equal to the energy storage voltage, the energy storage voltage is provided to the bus path through the bypass circuit so that the bus voltage is greater than or equal to a predetermined voltage within a hold-up time.

In one embodiment, the auxiliary power circuit includes a conversion unit, a voltage regulation circuit, and a charging path. The conversion unit is coupled to the conversion circuit. The voltage regulation circuit is coupled to the conversion unit. The charging path is coupled to the voltage regulation circuit, the energy storage capacitor, and the bypass circuit. When the conversion unit converts the working voltage into an auxiliary voltage, the voltage regulation circuit generates a regulation voltage according to the auxiliary voltage. The charging path is turned on by the regulation voltage and the energy storage capacitor is charged by the regulation voltage through the charging path so that the energy storage capacitor establishes the energy storage voltage. When the bus voltage is less or equal to the energy storage voltage, the energy storage voltage is provided to the bus path through the bypass circuit.

In one embodiment, the conversion unit is an induction coil. The induction coil is coupled to a transformer of the conversion circuit, and converts the working voltage of the transformer into the auxiliary voltage by an electromagnetic coupling manner.

In one embodiment, the conversion unit is a switching power converter. The switching power converter is coupled to the bus path, and uses the bus voltage as the working voltage and converts the working voltage into the auxiliary voltage.

In one embodiment, the conversion unit is a linear power converter. The linear power converter is coupled to the bus path, and uses the bus voltage as the working voltage and converts the working voltage into the auxiliary voltage.

In one embodiment, the conversion circuit includes an AC-to-DC converter. The conversion unit is coupled to the AC-to-DC converter, and acquires the working voltage according to an operation of the AC-to-DC converter and converts the working voltage into the auxiliary voltage.

In one embodiment, the conversion circuit includes a DC-to-DC converter. The conversion unit is coupled to the DC-to-DC converter, and acquires the working voltage according to an operation of the DC-to-DC converter and converts the working voltage into the auxiliary voltage.

In one embodiment, the bypass circuit is a first diode. When the bus voltage is less than or equal to the energy storage voltage, the first diode is forward biased, and when the bus voltage is greater than the energy storage voltage, the first diode is reverse biased.

In one embodiment, the bypass circuit includes a voltage detection circuit, a control unit, and a switch unit. The voltage detection circuit is coupled to the bus path. The control unit is coupled to the voltage detection circuit. The switch unit is coupled to the bus path, the energy storage capacitor, and the control unit. The voltage detection circuit detects a voltage signal of the bus voltage and the control unit determines whether the switch unit needs to be turned on according to the voltage signal. When the switch unit is turned on, the energy storage voltage supplements the bus voltage through the switch unit.

In one embodiment, the auxiliary power circuit further includes a current limitation resistor. The current limitation resistor is coupled to the voltage regulation circuit and the charging path. The current limitation resistor limits a charging current of charging the energy storage capacitor.

In one embodiment, the auxiliary power circuit further includes a transistor, a thyristor unit, and a current detection resistor. The transistor is coupled to the voltage regulation circuit. The thyristor unit is coupled to the voltage regulation circuit and the transistor. The current detection resistor is coupled to the transistor and the thyristor unit. The thyristor unit controls the transistor to provide a charging current with a fixed current value to charge the energy storage capacitor according a voltage across the current detection resistor.

In one embodiment, the charging path is a current adjustment unit composed of the transistor, the thyristor unit, and the current detection resistor.

In one embodiment, the charging path is a diode component.

In one embodiment, the energy storage voltage is equal to the regulation voltage minus a switch turned-on voltage of the charging path.

In one embodiment, the auxiliary power circuit further includes a voltage regulation unit. The voltage regulation unit is coupled to the voltage regulation circuit, the charging path, and the energy storage capacitor. The voltage regulation unit limits a gate voltage of the charging path to be less than or equal to a rated voltage.

In one embodiment, a capacitive withstand voltage of the energy storage capacitor is less than the maximum voltage of the bus voltage.

In one embodiment, the auxiliary power circuit further includes a second diode. The second diode is coupled to the voltage regulation circuit and the charging path. When the bus voltage is less than the regulation voltage, the second diode is forward biased so that the regulation voltage releases to the bus path.

In one embodiment, the auxiliary power circuit further includes a second diode. The second diode is coupled to the voltage regulation circuit and a power output end of the conversion circuit. When an output power source outputted from the conversion circuit is less than the regulation voltage, the second diode is forward biased so that the regulation voltage releases to the power output end.

In order to solve the above-mentioned problems, the present disclosure provides a conversion system having extended hold-up time. The conversion system includes a conversion circuit and a control circuit. The conversion circuit includes a first stage conversion unit and a second stage conversion unit. The first stage conversion unit converts an input power source into a bus voltage. The second stage conversion unit is coupled to the first stage conversion unit through a bus path, and converts the bus voltage into an output power source. The control circuit includes a bypass circuit, an energy storage capacitor, and an auxiliary power circuit. The bypass circuit is coupled to a live wire end of the bus path. The energy storage capacitor has a first end and a second end, the first end is coupled to the bypass circuit and the second end is coupled to a ground wire end of the bus path. The auxiliary power circuit is coupled to the bypass circuit and the conversion circuit. The auxiliary power circuit provides an energy storage voltage to the energy storage capacitor according to a working voltage provided by the conversion circuit. When the bus voltage of the bus path is less than or equal to the energy storage voltage, the energy storage voltage is provided to the bus path through bypass circuit so that the bus voltage is greater than or equal to a predetermined voltage within a hold-up time.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
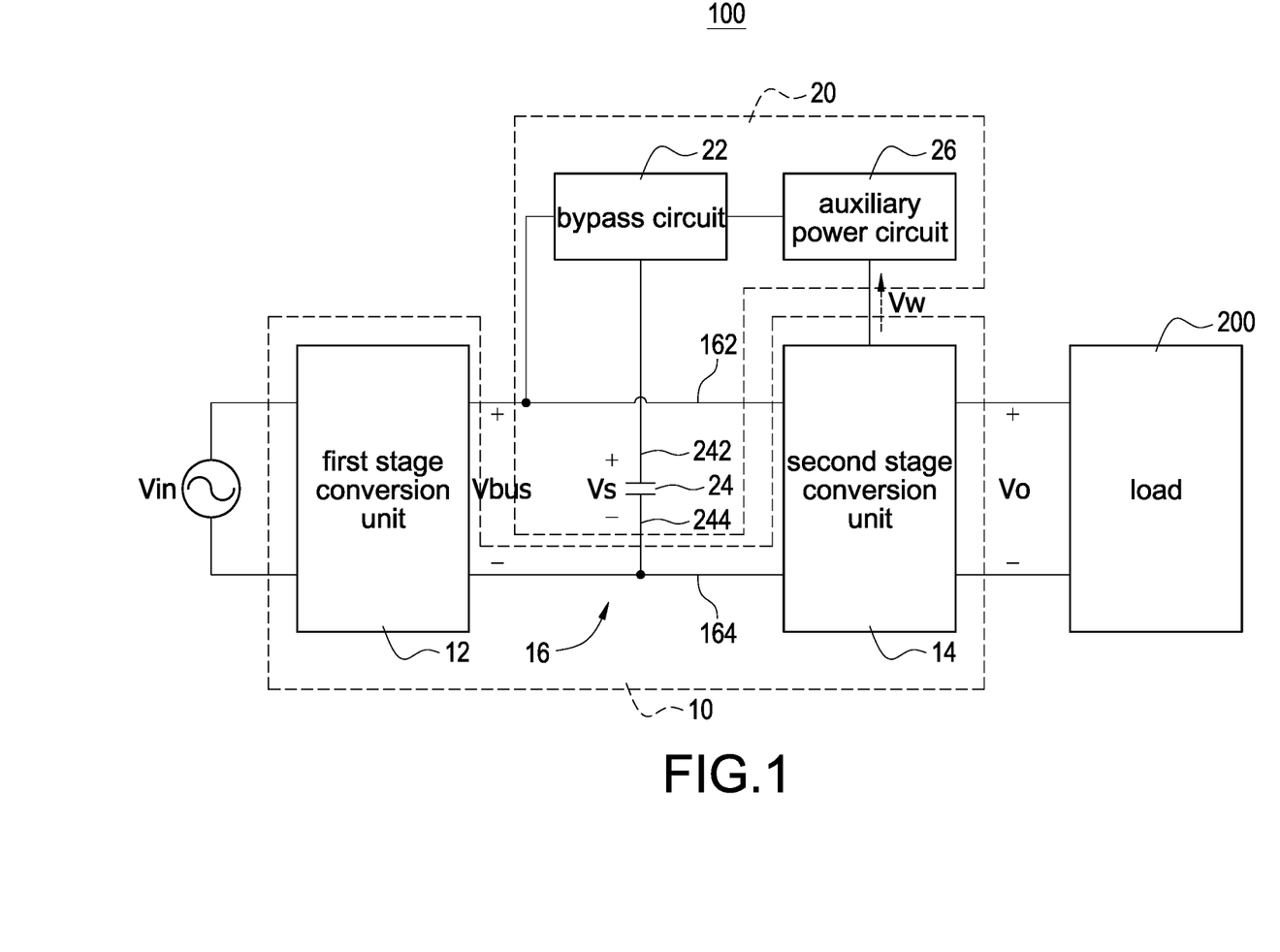
FIG. 1 is a block circuit diagram of a conversion system having extended hold-up time according to the present disclosure.

Please refer to FIG. 1, which shows a block circuit diagram of a conversion system having extended hold-up time according to the present disclosure. The conversion system 100 includes a conversion circuit 10 and a control circuit 20 having extended hold-up time. The conversion circuit 10 includes a first stage conversion unit 12, a second stage conversion unit 14, and a bus path 16. The first stage conversion unit 12 receives an input power source Vin and is coupled to the second stage conversion unit 14 through the bus path 16. The second stage conversion unit 14 is coupled to a load 200. The input power source Vin may be an AC power source or a DC power source. If the input power source Vin is the AC power source, the first stage conversion unit 12 is an AC-to-DC converter. If the input power source Vin is the DC power source, the first stage conversion unit 12 is a DC-to-DC converter. The second stage conversion unit 14 is similar to the first stage conversion unit 12, i.e., the second stage conversion unit 14 is a DC-to-AC converter or a DC-to-DC converter. The first stage conversion unit 12 converts the input power source Vin into a bus voltage Vbus and provides the bus voltage Vbus to the second stage conversion unit 14 through the bus path 16. The second stage conversion unit 14 converts the bus voltage Vbus into an output power source Vo and provides the output power source Vo to the load 200. In one embodiment, the conversion circuit 10 may be a power supply or a power supplying apparatus.

The control circuit 20 is coupled to the second stage conversion unit 14, a live wire end 162 and a ground wire end 164 (i.e., a ground end) of the bus path 16. The control circuit 20 includes a bypass circuit 22, an energy storage capacitor 24, and an auxiliary power circuit 26. Specifically, the bypass circuit 22 is coupled to the live wire end 162 of the bus path 16 and a first end 242 of the energy storage capacitor 24, and a second end 244 of the energy storage capacitor 24 is coupled to the ground wire end 164. The auxiliary power circuit 26 is coupled to the bypass circuit 22 and the conversion circuit 10 and receives a working voltage Vw provided by the conversion circuit 10. When the conversion circuit 10 normally converts the input power source Vin into the output power source Vo, the auxiliary power circuit 26 converts the working voltage Vw into an energy storage voltage Vs and provides the energy storage voltage Vs to the energy storage capacitor 24 so that two ends (i.e., the first end 242 and the second end 244) of the energy storage capacitor 24 establish the energy storage voltage Vs. When the conversion circuit 10 is abnormal (for example but not limited to the input power source Vin is powered off or the first stage conversion unit 12 is damaged), the bus voltage Vbus is gradually reduced. When the bus voltage Vbus is reduced to less than or equal to the energy storage voltage Vs, the energy storage voltage Vs is provided to the bus path 16 through the bypass circuit 22 to supplement the insufficient bus voltage Vbus. Therefore, the bus voltage Vbus can maintain to be greater than or equal to a predetermined voltage within a hold-up time. In particular, the predetermined voltage may be the minimum input voltage required for the second stage conversion unit 14 to normally operate.

Moreover, as shown in FIG. 1, since the first end 242 of the energy storage capacitor 24 is not coupled to the live wire end 162 of the bus path 16, the capacitive withstand voltage design of the energy storage capacitor 24 is not limited to be at least equal to the maximum voltage of the bus voltage Vbus. Instead, the capacitive withstand voltage of the energy storage capacitor 24 is selected according to a design point voltage of the auxiliary power circuit 26. Since the design point voltage of the auxiliary power circuit 26 can be much less than the bus voltage Vbus, the volume of the energy storage capacitor 24 can be greatly reduced to significantly increase the capacitance utilization of the energy storage capacitor 24. In one embodiment, the capacitive withstand voltage of the energy storage capacitor 24 may be a stable or unstable voltage, besides it may be less than the maximum voltage of the bus voltage Vbus, but the capacitive withstand voltage does not exceed the maximum voltage of the bus voltage Vbus. In one embodiment, the control circuit 20 may be included in a primary side or secondary side of the first stage conversion unit 12 or the inside of the second stage conversion unit 14, or may not be included in the conversion circuit 10.

Figure 2:
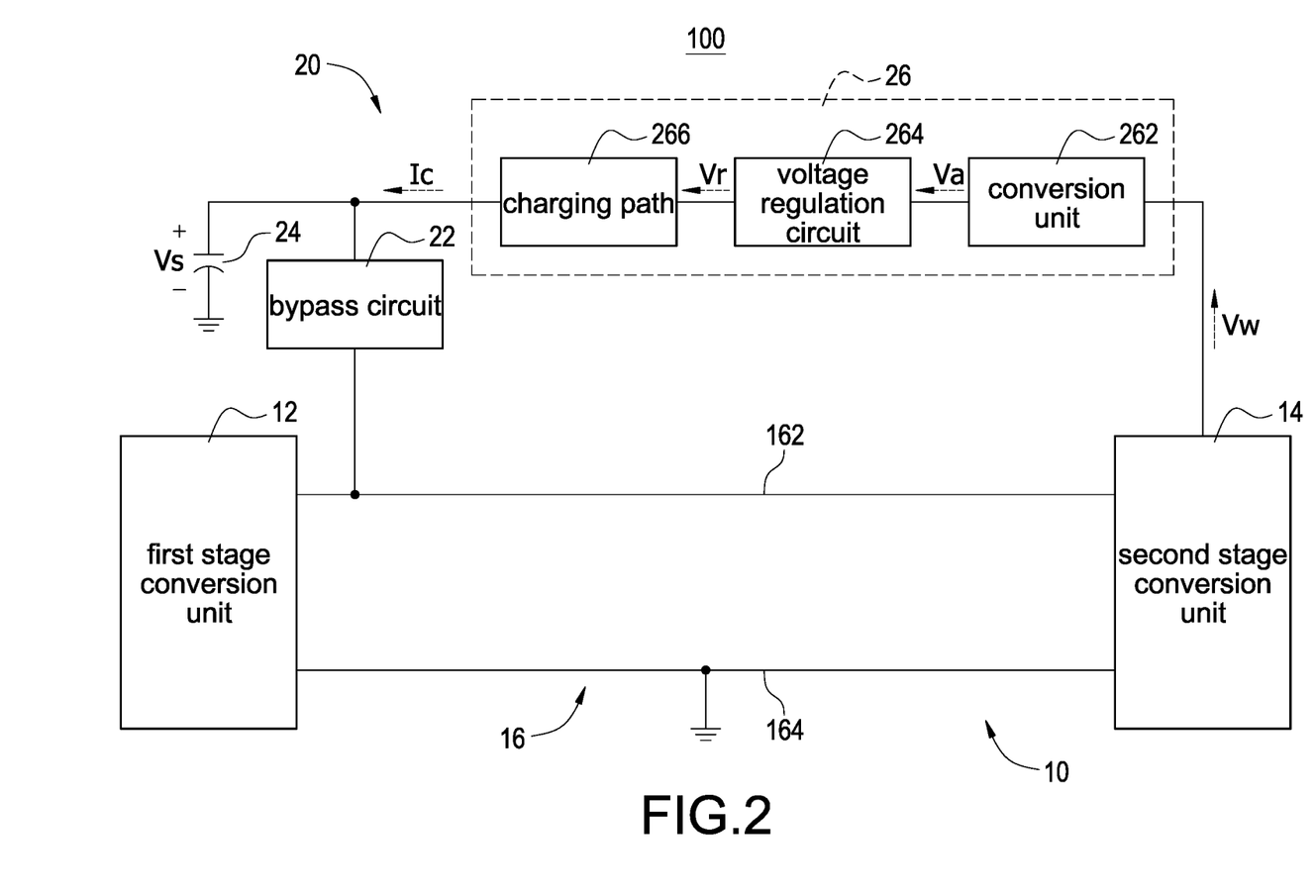
FIG. 2 is a block circuit diagram of an auxiliary power circuit according to the present disclosure.

Please refer to FIG. 2, which shows a block circuit diagram of an auxiliary power circuit according to the present disclosure, and also refer to FIG. 1. The auxiliary power circuit 26 includes a conversion unit 262, a voltage regulation circuit 264, and a charging path 266. The conversion unit 262 is coupled to the conversion circuit 10 and receives the working voltage Vw provided by the conversion circuit 10. The voltage regulation circuit 264 is coupled to the conversion unit 262 and the charging path 266. The charging path 266 is coupled to the energy storage capacitor 24 and the bypass circuit 22. The conversion unit 262 converts the working voltage Vw into an auxiliary voltage Va and provides the auxiliary voltage Va to the voltage regulation circuit 264. The voltage regulation circuit 264 generates a regulation voltage Vr according to the auxiliary voltage Va and the charging path 266 is turned on by the regulation voltage Vr. In this condition, the voltage regulation circuit 264 generates a charging current Ic according to a voltage difference between the regulation voltage Vr and the energy storage capacitor 24, and charges the energy storage capacitor 24 through the charging path 266 so that two ends (i.e., the first end 242 and the second end 244) of the energy storage capacitor 24 establish the energy storage voltage Vs. When the energy storage voltage Vs is charged to the regulation voltage Vr minus a switch turned-on voltage Vgs(th) of the charging path 266, the energy storage voltage Vs is balanced with the regulation voltage Vr, and the voltage regulation circuit 264 stops charging the energy storage capacitor 24. Therefore, the magnitude of the energy storage voltage Vs is determined by the regulation voltage Yr. When the bus voltage Vbus is less than or equal to the energy storage voltage Vs, the energy storage voltage Vs is provided to the bus path 16 through the bypass circuit 22.

Figure 3A:
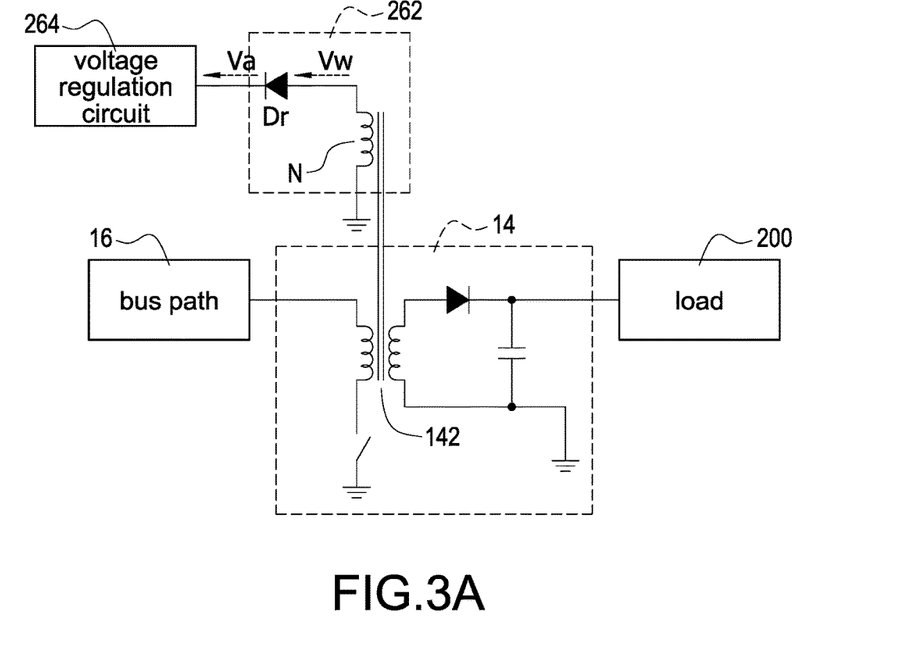
FIG. 3A is a block circuit diagram of a conversion unit according to a first embodiment of the present disclosure.

Please refer to FIG. 3A, which shows a block circuit diagram of a conversion unit according to a first embodiment of the present disclosure, and also refer to FIG. 1 to FIG. 2. Take the second stage conversion unit 14 as an isolated converter for example, the second stage conversion unit 14 includes a transformer 142. The conversion unit 262 is an induction coil N and the induction coil N is coupled to the transformer 142. When the second stage conversion unit 14 normally operate, the transformer 142 generates the working voltage Vw, and the working voltage Vw is converted into the auxiliary voltage Va by an electromagnetic coupling manner and according a relationship between the number of turns of induction coil N and transformer 142. In one embodiment, if the auxiliary voltage Va induced by the induction coil N is not a stable DC power source, the auxiliary voltage Va can be rectified to a stable DC power source by a rectification unit Dr shown in FIG. 3A.

Figure 3B:
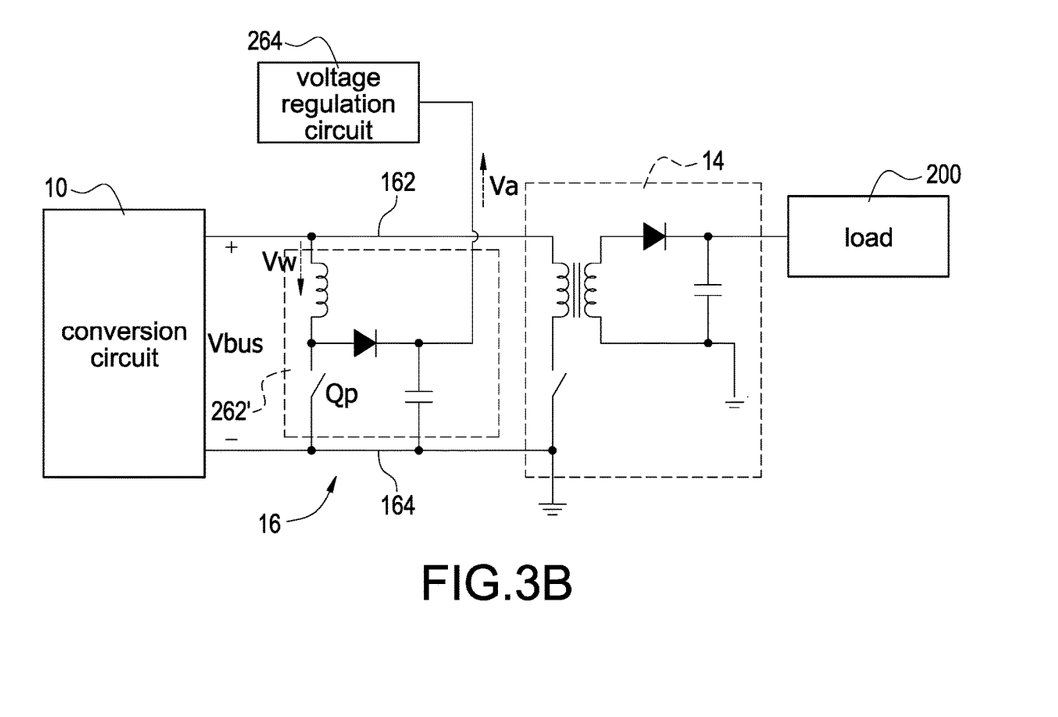
FIG. 3B is a block circuit diagram of the conversion unit according to a second embodiment of the present disclosure.

Please refer to FIG. 3B, which shows a block circuit diagram of the conversion unit according to a second embodiment of the present disclosure, and also refer to FIG. 1 to FIG. 3A. The difference between the conversion unit 262' in this embodiment and the conversion unit 262 shown in FIG. 3A is that the conversion unit 262' may be a switching or linear power converter. The switching power converter may be a boost convert, buck converter, or other types of converters for as a power converter with designable voltage range, and the switching power converter is coupled to the bus path 16. Since the conversion unit 262' is coupled to the bus path 16, the conversion unit 262' takes the bus voltage Vbus as the working voltage Vw, and converts the working voltage Vw into the auxiliary voltage Va by switching a power switch Qp inside the conversion unit 262' in a high frequency switching manner.

Figure 3C:
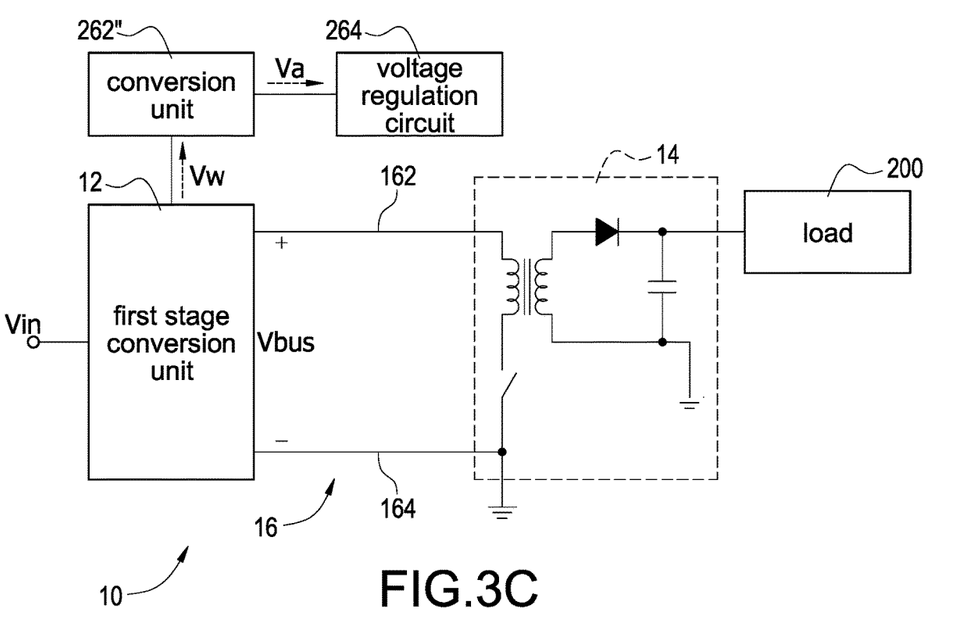
FIG. 3C is a block circuit diagram of the conversion unit according to a third embodiment of the present disclosure.

Please refer to FIG. 3C, which shows a block circuit diagram of the conversion unit according to a third embodiment of the present disclosure, and also refer to FIG. 1 to FIG. 3B. The difference between the conversion unit 262" in this embodiment and the conversion unit 262 shown in FIG. 3A is that the conversion unit 262" is coupled to the first stage conversion unit 12 and the first stage conversion unit 12 is an AC-to-DC converter or a DC-to-DC converter. When the first stage conversion unit 12 is the AC-to-DC converter, the input power source Vin received by the first stage conversion unit 12 is an AC power source. The conversion unit 262" is coupled to a DC terminal after a bridge rectifier inside the AC-to-DC converter, and acquires the working voltage Vw according to the operation of the AC-to-DC converter and converts the working voltage Vw into the auxiliary voltage Va by switching a power switch (not shown) inside the conversion unit 262" in a high frequency switching manner. When the first stage conversion unit 12 is the DC-to-DC converter, the input power source Vin received by the first stage conversion unit 12 is a DC power source. The conversion unit 262" is coupled to any one DC terminal inside the DC-to-DC converter, and acquires the working voltage Vw according to the operation of the DC-to-DC converter and converts the working voltage Vw into the auxiliary voltage Va by switching a power switch (not shown) inside the conversion unit 262" in a high frequency switching manner.

In one embodiment, the conversion unit 262 is not limited to the above-described implementations shown in FIG. 3A, FIG. 3B, and FIG. 3C. The types of conversion units that can acquire a stable DC power source and the coupling points of the conversion unit are all included in the scope of the present disclosure. For example but not limited to, the conversion unit 262 may be a linear power converter (not shown). The linear power converter is coupled to the bus path 16 or the first stage conversion unit 12, and takes the bus voltage Vbus or a DC voltage inside the first stage conversion unit 12 as the working voltage Vw, and converts the working voltage Vw into the auxiliary voltage Va in a linear conversion manner. In one embodiment, the conversion unit 262" shown in FIG. 3C may be coupled inside the second stage conversion unit 14 (i.e., the second stage conversion unit 14 is also the DC-to-DC converter), and acquires the working voltage Vw according to the operation of the second stage conversion unit 14. The difference with FIG. 3A is that the conversion unit 262' does not need to acquire the working voltage Vw in an electromagnetic coupling manner of FIG. 3A, but is acquired by coupling to any one DC terminal inside the second stage conversion unit 14.

Figure 4A:
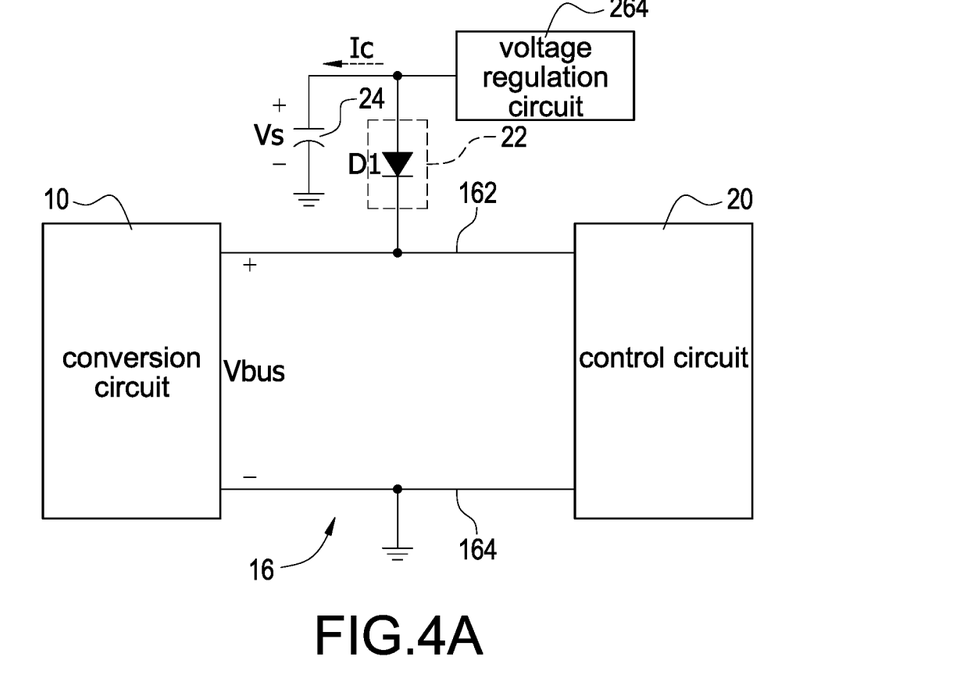
FIG. 4A is a block circuit diagram of a bypass circuit according to a first embodiment of the present disclosure.

Please refer to FIG. 4A, which shows a block circuit diagram of a bypass circuit according to a first embodiment of the present disclosure, and also refer to FIG. 1 to FIG. 3B. The bypass circuit 22 is a first diode D1, and an anode of the first diode D1 is coupled to the energy storage capacitor 24 and a cathode of the first diode D1 is coupled to the bus path 16. When the bus voltage Vbus is less than or equal to the energy storage voltage Vs, the first diode D1 is forward biased so that the energy storage voltage Vs supplements the insufficient bus voltage Vbus through the first diode D1. When the bus voltage Vbus is greater than the energy storage voltage Vs, the first diode D1 is reverse biased so that the energy storage voltage Vs fails to supplement the insufficient bus voltage Vbus through the first diode D1.

Figure 4B:
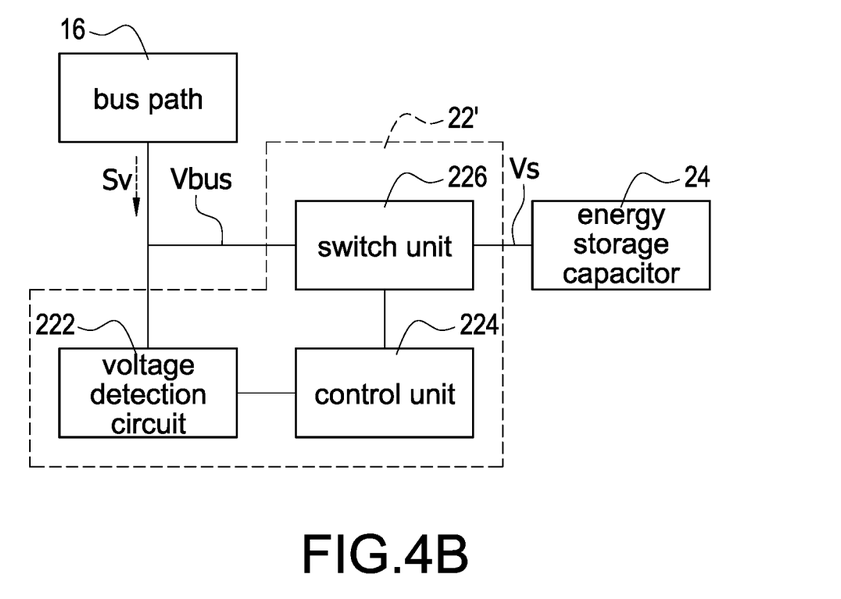
FIG. 4B is a block circuit diagram of the bypass circuit according to a second embodiment of the present disclosure.

Please refer to FIG. 4B, which shows a block circuit diagram of the bypass circuit according to a second embodiment of the present disclosure, and also refer to FIG. 1 to FIG. 4A. The difference between the bypass circuit 22' in this embodiment and the bypass circuit 22 shown in FIG. 4A is that the bypass circuit 22' includes a voltage detection circuit 222, a control unit 224, and a switch unit 226. The voltage detection circuit 222 is coupled to the bus path 16 and detects a voltage signal Sv of the bus voltage Vbus. The control unit 224 is coupled to the voltage detection circuit 222, and the switch unit 226 is coupled to the bus path 16, the energy storage capacitor 24, and the control unit 224. The control unit 224 receives the voltage signal Sv and determines whether the switch unit 226 needs to be turned on according to the voltage signal Sv. When the control unit 224 determines that the bus voltage Vbus is less than a reference voltage of the voltage detection circuit 222 according to the voltage signal Sv, the control unit 224 controls the switch unit 226 to be turned on so that the energy storage voltage Vs supplements the insufficient bus voltage Vbus through the switch unit 226. When the control unit 224 determines that the bus voltage Vbus is greater than the reference voltage of the voltage detection circuit 222 according to the voltage signal Sv, the control unit 224 controls the switch unit 226 to be turned off to make the disconnection between the energy storage capacitor 24 and the bus path 16. In one embodiment, the operation point at which the switch unit 226 is turned on is not limited to any voltage. The control unit 224 can determine the operation point at which the switch unit 226 is turned on according to conditions of use, that is, the control unit 224 can set a threshold voltage. When the bus voltage Vbus is less than the threshold voltage, the control unit 224 controls the switch unit 226 to be turned on. Also, the control unit 224 controls the switch unit 226 to be turned off when the bus voltage Vbus does not have to be greater than the energy storage voltage Vs. In addition, if the control unit 224 can determine the operation point at which the switch unit 226 is turned on according to conditions of use, the capacitive withstand voltage of the energy storage capacitor 24 can also be adjusted as the threshold voltage.

Figure 5:
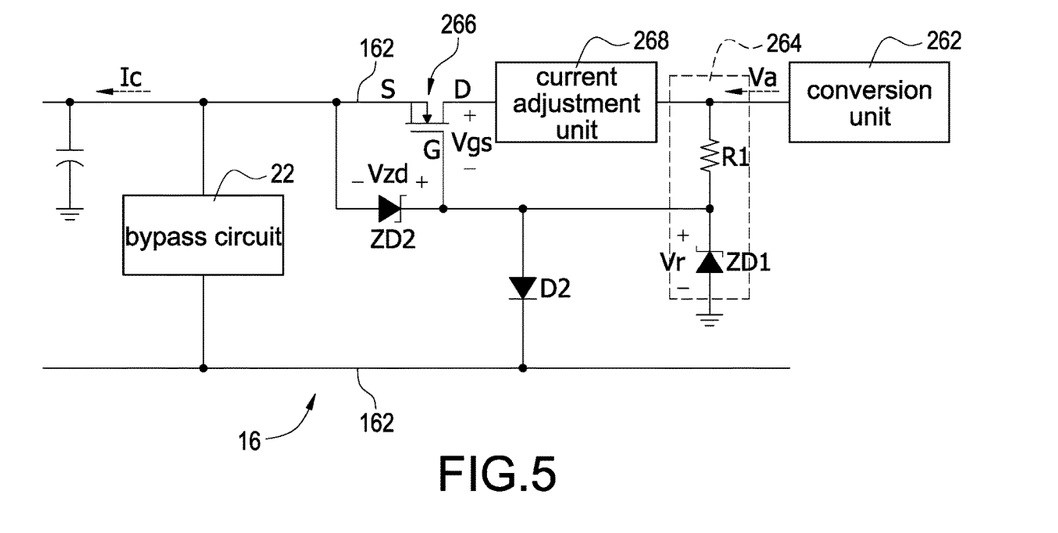
FIG. 5 is a detailed circuit diagram of the auxiliary power circuit according to the present disclosure.

Please refer to FIG. 5, which shows a detailed circuit diagram of the auxiliary power circuit according to the present disclosure, and also refer to FIG. 1 to FIG. 4B. The voltage regulation circuit 264 includes a first resistor R1 and a first voltage regulation unit ZD1. The first resistor R1 is coupled to the conversion unit 262 and the first voltage regulation unit ZD1, and the first voltage regulation unit ZD1 is coupled to the ground end. The charging path 266 is a MOSFET having a drain D, a source S, and a gate G, and the drain D is coupled to the first resistor R1 and the conversion unit 262. The gate G of the MOSFET is coupled to the first resistor R1 and the first voltage regulation unit ZD1, and the source S is coupled to the energy storage capacitor 24 and the bypass circuit 22. The first resistor R1 is used for current limitation. The regulation voltage Vr is established by the first voltage regulation unit ZD1 from the auxiliary voltage Va, and the switch turned-on voltage Vgs(th) is established between the gate G and the source S of the MOSFET from the regulation voltage Vr so that the drain D and the source S of the MOSFET are turned on. In this condition, the voltage regulation circuit 264 generates the charging current Ic according to a voltage difference between the regulation voltage Vr and the energy storage capacitor 24, and charges the energy storage capacitor 24 through turned-on drain D and source S. The energy storage voltage Vs is equal to the regulation voltage Vr minus the switch turned-on voltage Vgs(th) between the drain D and the source S.

As shown in FIG. 5, the auxiliary power circuit 26 further a current adjustment unit 268, a second voltage regulation unit ZD2, and a second diode D2. The current adjustment unit 268 is coupled between the voltage regulation circuit 264 and the drain D of the MOSFET for adjusting the magnitude of the charging current Ic of charging the energy storage capacitor 24 and avoiding damaging the energy storage capacitor 24 from the over current. The second voltage regulation unit ZD2 is coupled between the source S and the gate G to establish a rated voltage Vzd between the source S and the gate G, thereby limiting a gate voltage Vg to be less than or equal to the rated voltage Vzd and avoiding damaging the MOSFET from the over voltage. Specifically, the gate voltage Vg generally exceeds, for example but not limited to, 40 volts (depending on the type of the MOSFET) to cause breakdown between the source S and the gate G, thereby damaging the MOSFET. Therefore, the second voltage regulation unit ZD2 is used to limit the gate voltage Vg to be less than 40 volts, for example 20 volts, thereby avoiding damaging the MOSFET from excessive gate voltage Vg.

The second diode D2 is coupled to the first resistor R1, the first voltage regulation unit ZD1, the gate G of the MOSFET, the second voltage regulation unit ZD2, and the live wire end 162 of the bus path 16. When the bus voltage Vbus is less than the regulation voltage Vr of the first voltage regulation unit ZD1, the second diode D2 is forward biased so that the regulation voltage Vr of the first voltage regulation unit ZD1 releases to the bus path 16. In this condition, the regulation voltage Vr is reduced to be substantially equal to the bus voltage Vbus. Since the regulation voltage Vr is substantially equal to the bus voltage Vbus, the energy storage voltage Vs of the energy storage capacitor 24 is decreased as the regulation voltage Vr decreases, thereby avoiding instantaneously excessive energy is injected into the bus path 16 due to excessive voltage difference between the energy storage voltage Vs and the bus voltage Vbus. Furthermore, the second stage conversion unit 14 is also generally a switching power converter. When the input end (on the bus path 16) of the second stage conversion unit 14 is less than the bus voltage Vbus but does not directly reduce to zero, the auxiliary voltage Va continuously releases energy to the bus voltage Vbus, thereby causing energy waste due to accumulation of extra energy at the input end. In order to avoid the above situation, the regulation voltage Vr is reduced to be substantially equal to the bus voltage Vbus, and further the overall efficiency of the conversion system 100 can be increased. In addition, the second diode D2 may be coupled to an output end of the second stage conversion unit 14 (i.e., a positive polarity end of the output power source Vo shown in FIG. 1) for avoiding instantaneously excessive energy is injected into the output end of the second stage conversion unit 14 due to excessive voltage difference between the energy storage voltage Vs and the output power source Vo. The circuit operation and the function are the same as the second diode D2 coupled to the live wire end 162 of the bus path 16, and will not be described herein. In one embodiment, the detailed circuit structure of the auxiliary power circuit 26 can be implemented in a variety of circuits, components, controllers, and even hardware and software. Therefore, circuits, components, controllers, and hardware and software that can achieve the above-mentioned circuit functions should be included in the scope of the present disclosure.

Figure 6A:
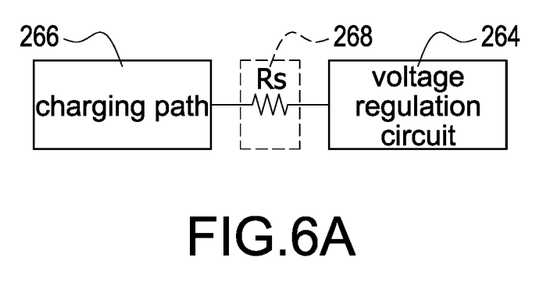
FIG. 6A is a circuit diagram of a current adjustment unit according to a first embodiment of the present disclosure.

Please refer to FIG. 6A, which shows a circuit diagram of a current adjustment unit according to a first embodiment of the present disclosure, and also refer to FIG. 1 to FIG. 5. The current adjustment unit 268 may be a current limitation resistor Rs, and one end of the current limitation resistor Rs is coupled to the first resistor R1 and the other end thereof is coupled to the drain D of the MOSFET. The current limitation resistor Rs is used to limit the magnitude of the charging current Ic of charging the energy storage capacitor 24, thereby avoiding the decrease in life of the energy storage capacitor 24 from the instantaneously large current. In one embodiment, the current limitation resistor Rs may also be coupled after the charging path 266 or before the voltage regulation circuit 264. In other words, the current limitation resistor Rs may be coupled to a path between the conversion unit 262 and the energy storage capacitor 24.

Figure 6B:
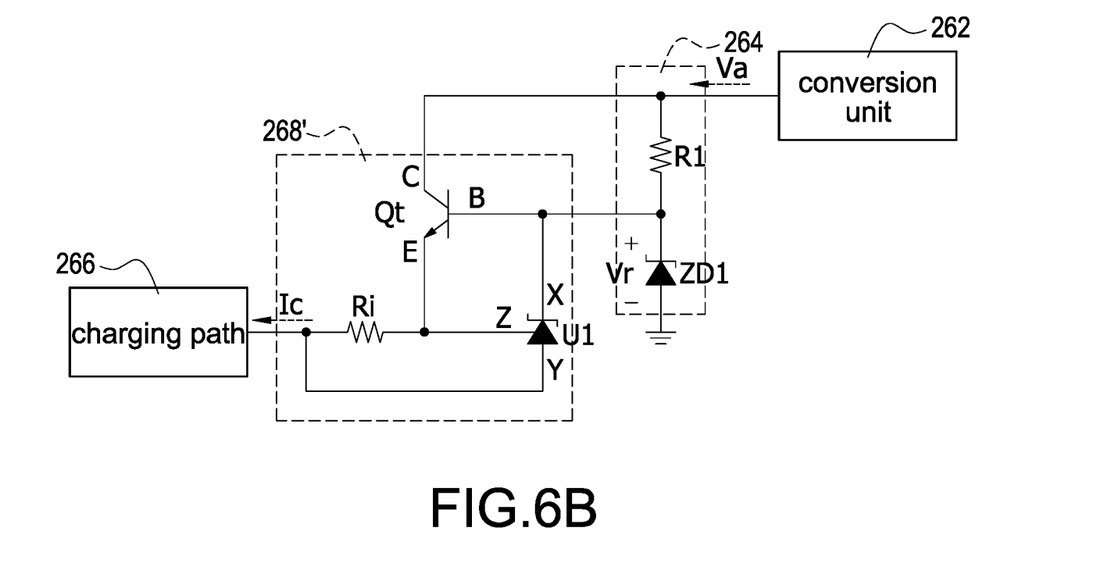
FIG. 6B is a circuit diagram of the current adjustment unit according to a second embodiment of the present disclosure.

Please refer to FIG. 6B, which shows a circuit diagram of the current adjustment unit according to a second embodiment of the present disclosure, and also refer to FIG. 1 to FIG. 6A. The difference between the current adjustment unit 268' in this embodiment and the current adjustment unit 268 shown in FIG. 6A is that the current adjustment unit 268' includes a transistor Qt, a thyristor unit U1, and a current detection resistor R1. The transistor Qt includes a collector C, a base B, and an emitter E, and the thyristor unit U1 includes an input end X, an output end Y, and a control end Z. The collector C of the transistor Qt is coupled to the voltage regulation circuit 264, and the base B is coupled to the input end X of the thyristor unit U1 and the voltage regulation circuit 264. One end of the current detection resistor R1 is coupled to the emitter E of the transistor Qt and the control end Z of the thyristor unit U1, and the other end of the current detection resistor R1 is coupled to the output end Y of the thyristor unit U1 and the source S of the MOSFET. When the charging current Ic flows through the current detection resistor R1, a voltage difference is generated between two ends of the current detection resistor R1. The thyristor unit U1 realizes the voltage difference between two ends of the current detection resistor R1 through the output end Y and the control end Z and adjusts the current of the input end X of the thyristor unit U1 according to the voltage difference. In this condition, since the current of the emitter E is adjusted based on the current of the base B, the current of the emitter E of the transistor Qt is also adjusted when the current of the input end X of the thyristor unit U1 is adjusted. Therefore, when the charging current Ic is too large, the voltage difference between two ends of the current detection resistor R1 is increased so that the current of the input end X of the thyristor unit U1 is adjusted to be smaller and the current of the emitter E of the transistor Qt is also adjusted to be smaller. When the charging current Ic is reduced, the voltage difference between two ends of the current detection resistor R1 is reduced so that the current of the input end X of the thyristor unit U1 is adjusted to be larger and the current of the emitter E of the transistor Qt is also adjusted to be larger. Therefore, the thyristor unit U1 controls the transistor Qt to provide the charging current Ic with a fixed current value to charge the energy storage capacitor 24 according to the voltage difference between two ends of the current detection resistor R1.

In one embodiment, the current adjustment units 268,268' are not limited to being constructed only by the above elements. In other words, they can also be achieved by using, for example but not limited to, a constant current regulator (CCR), a current regulative diode (CRD), or a controller with wires. Therefore, any component or circuit having a current adjustment function should be included in the scope of the present disclosure. In addition, since the current adjustment unit 268' includes the transistor Qt, the thyristor unit U1, and the current detection resistor R1, the function of the charging path 266 can be replaced by the current adjustment unit 268'. In other words, the current adjustment unit 268' is the charging path 266, and the current detection resistor R1 of the current adjustment unit 268' is directly coupled to the first end 242 of the energy storage capacitor 24, and the charging current Ic is adjusted by the transistor Qt to make the energy storage capacitor 24 establish the energy storage voltage Vs. Alternatively, the charging path 266 is a diode component (not shown), and an anode of the diode component is coupled to the current detection resistor R1 and a cathode of the diode component is coupled to the energy storage capacitor 24.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A control circuit having extended hold-up time coupled to a bus path of a conversion circuit, the control circuit comprising:
   a bypass circuit coupled to a live wire end of the bus path,
   an energy storage capacitor having a first end and a second end, the first end coupled to the bypass circuit and the second end coupled to a ground wire end of the bus path, and
   an auxiliary power circuit coupled to the bypass circuit and the conversion circuit, the auxiliary power circuit comprising a conversion unit coupled to the conversion circuit, a voltage regulation circuit coupled to the conversion unit, and a charging path coupled to the voltage regulation circuit, the energy storage capacitor, and the bypass circuit, and a voltage regulation unit coupled to the voltage regulation circuit, the charging path, and the energy storage capacitor,
   wherein the auxiliary power circuit is configured to provide an energy storage voltage to the energy storage capacitor according to a working voltage provided by the conversion circuit; when a bus voltage of the bus path is less than or equal to the energy storage voltage, the energy storage voltage is provided to the bus path through the bypass circuit so that the bus voltage is greater than or equal to a predetermined voltage within a hold-up time,
   wherein when the conversion unit is configured to convert the working voltage into an auxiliary voltage, the voltage regulation circuit is configured to generate a regulation voltage according to the auxiliary voltage; the charging path is turned on by the regulation voltage and the energy storage capacitor is charged by the regulation voltage through the charging path so that the energy storage capacitor is configured to establish the energy storage voltage; when the bus voltage is less or equal to the energy storage voltage, the energy storage voltage is provided to the bus path through the bypass circuit, and
   wherein the voltage regulation unit is configured to limit a gate voltage of the charging path to be less than or equal to a rated voltage.

2. The control circuit having the extended hold-up time in claim 1, wherein the conversion unit is an induction coil; the induction coil is coupled to a transformer of the conversion circuit, and is configured to convert the working voltage of the transformer into the auxiliary voltage by an electromagnetic coupling manner.

3. The control circuit having the extended hold-up time in claim 1, wherein the conversion unit is a switching power converter; the switching power converter is coupled to the bus path, and is configured to use the bus voltage as the working voltage and convert the working voltage into the auxiliary voltage.

4. The control circuit having the extended hold-up time in claim 1, wherein the conversion unit is a linear power converter; the linear power converter is coupled to the bus path, and is configured to use the bus voltage as the working voltage and convert the working voltage into the auxiliary voltage.

5. The control circuit having the extended hold-up time in claim 1, wherein the conversion circuit comprises an AC-to-DC converter; the conversion unit is coupled to the AC-to-DC converter, and is configured to acquire the working voltage according to an operation of the AC-to-DC converter and convert the working voltage into the auxiliary voltage.

6. The control circuit having the extended hold-up time in claim 1, wherein the conversion circuit comprises a DC-to-DC converter; the conversion unit is coupled to the DC-to-DC converter, and is configured to acquire the working voltage according to an operation of the DC-to-DC converter and convert the working voltage into the auxiliary voltage.

7. The control circuit having the extended hold-up time in claim 1, wherein the bypass circuit is a first diode; when the bus voltage is less than or equal to the energy storage voltage, the first diode is forward biased, and when the bus voltage is greater than the energy storage voltage, the first diode is reverse biased.

8. The control circuit having the extended hold-up time in claim 1, wherein the bypass circuit comprises:
   a voltage detection circuit coupled to the bus path,
   a control unit coupled to the voltage detection circuit, and
   a switch unit coupled to the bus path, the energy storage capacitor, and the control unit,
   wherein the voltage detection circuit is configured to detect a voltage signal of the bus voltage and the control unit is configured to determine whether the switch unit needs to be turned on according to the voltage signal; when the switch unit is turned on, the energy storage voltage supplements the bus voltage through the switch unit.

9. The control circuit having the extended hold-up time in claim 1, wherein the auxiliary power circuit further comprises:
   a current limitation resistor coupled to the voltage regulation circuit and the charging path,
   wherein the current limitation resistor is configured to limit a charging current of charging the energy storage capacitor.

10. The control circuit having the extended hold-up time in claim 1, wherein the auxiliary power circuit further comprises:
    a transistor coupled to the voltage regulation circuit,
    a thyristor unit coupled to the voltage regulation circuit and the transistor, and
    a current detection resistor coupled to the transistor and the thyristor unit,
    wherein the thyristor unit is configured to control the transistor to provide a charging current with a fixed current value to charge the energy storage capacitor according a voltage across the current detection resistor.

11. The control circuit having the extended hold-up time in claim 10, wherein the charging path is a current adjustment unit composed of the transistor, the thyristor unit, and the current detection resistor.

12. The control circuit having the extended hold-up time in claim 10, wherein the charging path is a diode component.

13. The control circuit having the extended hold-up time in claim 1, wherein the energy storage voltage is equal to the regulation voltage minus a switch turned-on voltage of the charging path.

14. The control circuit having the extended hold-up time in claim 1, wherein a capacitive withstand voltage of the energy storage capacitor is less than the maximum voltage of the bus voltage.

15. The control circuit having the extended hold-up time in claim 1, wherein the auxiliary power circuit further comprises:
    a second diode coupled to the voltage regulation circuit and the charging path, wherein when the bus voltage is less than the regulation voltage, the second diode is forward biased so that the regulation voltage releases to the bus path.

16. The control circuit having the extended hold-up time in claim 1, wherein the auxiliary power circuit further comprises:
a second diode coupled to the voltage regulation circuit and a power output end of the conversion circuit,
wherein when an output power source outputted from the conversion circuit is less than the regulation voltage, the second diode is forward biased so that the regulation voltage releases to the power output end.

17. A conversion system having extended hold-up time comprising:
a conversion circuit comprising:
a first stage conversion unit configured to convert an input power source into a bus voltage, and
a second stage conversion unit coupled to the first stage conversion unit through a bus path, and configured to convert the bus voltage into an output power source, and
a control circuit coupled to the bus path, and comprising:
a bypass circuit coupled to a live wire end of the bus path,
an energy storage capacitor having a first end and a second end, the first end coupled to the bypass circuit and the second end coupled to a ground wire end of the bus path, and
an auxiliary power circuit coupled to the bypass circuit and the conversion circuit, the auxiliary power circuit comprising a conversion unit coupled to the conversion circuit, a voltage regulation circuit coupled to the conversion unit, a charging path coupled to the voltage regulation circuit, the energy storage capacitor, and the bypass circuit, and a voltage regulation unit coupled to the voltage regulation circuit, the charging path, and the energy storage capacitor,
wherein the auxiliary power circuit is configured to provide an energy storage voltage to the energy storage capacitor according to a working voltage provided by the conversion circuit; when the bus voltage of the bus path is less than or equal to the energy storage voltage, the energy storage voltage is provided to the bus path through bypass circuit so that the bus voltage is greater than or equal to a predetermined voltage within a hold-up time,
wherein when the conversion unit is configured to convert the working voltage into an auxiliary voltage, the voltage regulation circuit is configured to generate a regulation voltage according to the auxiliary voltage; the charging path is turned on by the regulation voltage and the energy storage capacitor is charged by the regulation voltage through the charging path so that the energy storage capacitor is configured to establish the energy storage voltage; when the bus voltage is less or equal to the energy storage voltage, the energy storage voltage is provided to the bus path through the bypass circuit, and
wherein the voltage regulation unit is configured to limit a gate voltage of the charging path to be less than or equal to a rated voltage.

* * * * *